United States Patent
Harada et al.

(10) Patent No.: US 9,849,443 B2
(45) Date of Patent: Dec. 26, 2017

(54) EXHAUST GAS PURIFICATION CATALYST

(71) Applicant: CATALER CORPORATION, Kakegawa-shi, Shizuoka (JP)

(72) Inventors: Takahiro Harada, Kakegawa (JP); Keiichi Narita, Kakegawa (JP); Michio Tanaka, Kakegawa (JP); Hironobu Kunioku, Kakegawa (JP); Ryota Nakashima, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

(21) Appl. No.: 15/102,653

(22) PCT Filed: Dec. 9, 2014

(86) PCT No.: PCT/JP2014/082541
§ 371 (c)(1),
(2) Date: Jun. 8, 2016

(87) PCT Pub. No.: WO2015/087873
PCT Pub. Date: Jun. 18, 2015

(65) Prior Publication Data
US 2017/0014806 A1    Jan. 19, 2017

(30) Foreign Application Priority Data
Dec. 13, 2013  (JP) ................ 2013-258648

(51) Int. Cl.
*B01J 23/63* (2006.01)
*B01D 53/94* (2006.01)
(Continued)

(52) U.S. Cl.
CPC ........... *B01J 23/63* (2013.01); *B01D 53/945* (2013.01); *B01J 21/04* (2013.01); *B01J 21/066* (2013.01);
(Continued)

(58) Field of Classification Search
CPC . B01J 23/63; B01J 21/04; B01J 21/066; B01J 35/04; B01J 35/1014; B01J 35/1019;
(Continued)

(56) References Cited

U.S. PATENT DOCUMENTS 3,692,497 A * 9/1972 Keith et al. .......... B01D 53/944
                                                          29/455.1
6,432,859 B1 * 8/2002 Iwakuni ............. B01D 53/9422
                                                            502/325
(Continued)

FOREIGN PATENT DOCUMENTS

JP     61-074650    *  4/1986   .............. B01J 33/00
JP     S61-74650 A      4/1986
(Continued)

OTHER PUBLICATIONS

Mar. 17, 2015 International Search Report issued in International Patent Application No. PCT/JP2014/082541.
(Continued)

*Primary Examiner* — Patricia L Hailey
(74) *Attorney, Agent, or Firm* — Oliff PLC (57) ABSTRACT

Provided is an exhaust gas purification catalyst with excellent durability against exhaust gas including a poisoning substance. The exhaust gas purification catalyst includes a porous substrate, a catalyst coating layer formed on the porous substrate, and a dummy coating layer formed on the outermost surface of the catalyst coating layer. The catalyst coating layer has a carrier and a noble metal catalyst supported on the carrier. The dummy coating layer includes a carrier having at least alumina and does not include a noble metal catalyst. The dummy coating layer is formed to have a length which, from the end on the exhaust gas inlet side, is 10% to 70% of the entire length of the catalyst coating layer along the exhaust gas flow direction.

8 Claims, 6 Drawing Sheets

(51) Int. Cl.
*B01J 37/02* (2006.01)
*B01J 21/06* (2006.01)
*B01J 35/10* (2006.01)
*B01J 21/04* (2006.01)
*B01J 35/04* (2006.01)
*F01N 3/28* (2006.01)
*F01N 3/10* (2006.01)

(52) U.S. Cl.
CPC ............ *B01J 35/04* (2013.01); *B01J 35/1014* (2013.01); *B01J 35/1019* (2013.01); *B01J 37/0244* (2013.01); *F01N 3/2803* (2013.01); *B01D 2255/10* (2013.01); *B01D 2255/908* (2013.01); *B01D 2255/9022* (2013.01); *B01D 2255/9025* (2013.01); *B01D 2255/9032* (2013.01); *B01D 2255/9202* (2013.01); *B01D 2255/9207* (2013.01); *F01N 3/101* (2013.01); *F01N 2510/0682* (2013.01); *F01N 2510/0684* (2013.01); *Y02T 10/22* (2013.01)

(58) Field of Classification Search
CPC ............... B01J 37/0244; B01D 53/945; B01D 2255/10; B01D 2255/9022; B01D 2255/9025; B01D 2255/9032; B01D 2255/908; B01D 2255/9202; B01D 2255/9207
USPC ................... 502/325, 327; 423/213.5, 239.1
See application file for complete search history.

(56) References Cited

U.S. PATENT DOCUMENTS

| | | | | |
|---|---|---|---|---|
| 6,649,563 B2* | 11/2003 | Nakanishi | .......... | B01D 53/9422 422/122 |
| 6,667,018 B2* | 12/2003 | Noda | .................... | B01D 53/945 423/213.2 |
| 7,153,810 B2* | 12/2006 | Park | .................... | B01D 53/9422 423/239.1 |
| 8,207,084 B2* | 6/2012 | Cheng | ................ | B01D 53/9418 502/259 |
| 8,258,075 B2* | 9/2012 | Nochi | .................. | B01D 53/945 502/104 |
| 8,329,607 B2* | 12/2012 | Kazi | .................... | B01D 53/944 422/180 |
| 8,546,296 B2* | 10/2013 | Yabuzaki | ............ | B01D 53/945 423/213.5 |
| 9,259,716 B2* | 2/2016 | Nazarpoor | ............. | B01J 23/894 |
| 2002/0132730 A1* | 9/2002 | Hwang | .................. | A47L 19/04 502/212 |
| 2008/0038172 A1 | 2/2008 | Chen et al. | | |
| 2011/0245076 A1* | 10/2011 | Matsueda | ............ | B01D 53/945 502/328 |
| 2014/0242406 A1 | 8/2014 | Kimura et al. | | |

FOREIGN PATENT DOCUMENTS

| | | |
|---|---|---|
| JP | S61-274746 A | 12/1986 |
| JP | 2010-500922 A | 1/2010 |
| JP | 2011-104485 A | 6/2011 |
| JP | 2011-212639 A | 10/2011 |
| JP | 2014-161809 A | 9/2014 |

OTHER PUBLICATIONS

Jan. 6, 2016 International Preliminary Report on Patentability issued in International Patent Application No. PCT/JP2014/082541.

* cited by examiner

EXHAUST GAS PURIFICATION CATALYST

TECHNICAL FIELD

The present invention relates to an exhaust gas purification catalyst for purifying exhaust gas discharged from an internal combustion engine.

The present application claims priority to Japanese Patent Application No. 2013-258648 filed on Dec. 13, 2013; and the entire contents of which are incorporated herein by reference.

BACKGROUND ART

In general, exhaust gas discharged from an automobile engine (for example, a gasoline engine) includes components such as hydrocarbons (HC), carbon monoxide (CO), nitrogen oxides (NOx). An exhaust gas purification catalyst for removing these components from the exhaust gas is disposed in the exhaust gas passage of an internal combustion engine. Such an exhaust gas purification catalyst is configured by forming a catalyst coating layer on a substrate surface. The catalyst coating layer is constituted by a noble metal catalyst and a carrier that supports the noble metal catalyst.

For this type of exhaust gas purification catalyst, the so-called three-way catalyst is used. In the three-way catalyst, platinum (Pt), rhodium (Rh), palladium (Pd), and the like, are used as noble metal catalysts. Among the noble metal catalysts, Pt and Pd mainly contribute to the ability to purify (by oxidation) hydrocarbons (HC) and carbon monoxide (CO). Further, Rh contributes to the ability to purify (by reduction) nitrogen oxides (NOx).

Examples of conventional art literature related to the exhaust gas purification catalysts using such three-way catalyst include Patent Literature 1-3. For example, the exhaust gas purification catalyst according to Patent Literature 1 is provided with a catalyst coating layer which is formed on a substrate and has a noble metal catalyst such as Pt and Pd and an oxygen storing/releasing material (referred to hereinbelow as OSC (oxygen storage capacity) material) such as $CeO_2$.

CITATION LIST

Patent Literature

Patent Literature 1: Japanese Patent Application Publication No. 2011-212639

Patent Literature 2: Japanese Patent Application Publication No. 2011-104485

Patent Literature 3: Japanese Patent Application Publication No. 2014-161809

SUMMARY OF INVENTION

However, when the engine of an automobile, or the like, is operated, not only fuel such as gasoline, but also engine oil and various additives (antioxidants, purification agents, acid treatment agents, etc.) are used. Such engine oil and other additives can include poisoning substances such as phosphorus (P), calcium (Ca), lead (Pb), zinc (Zn), and magnesium (Mg). When the exhaust gas including such poisoning substances reaches the exhaust gas purification catalyst, the poisoning substances can adhere to the catalyst coating layer. In the catalyst coating layer to which the poisoning substances have adhered, active species can be covered or fine pores can be closed by the formation of inactive species. As a result, in the portions to which the poisoning substances have adhered, the number of active centers of the noble metal catalyst can be reduced and the catalyst purification performance can be degraded.

The present invention has been created to resolve the above-described problems, and it is an objective of the present invention to provide an exhaust gas purification catalyst that excels in durability against exhaust including poisoning substances such as derived from engine oil and various other additives.

The inventors have created the present invention which is capable of attaining the abovementioned objective on the basis of the results obtained in a comprehensive research.

Thus, the exhaust gas purification catalyst disclosed herein is disposed in the exhaust gas passage of an internal combustion engine and purifies the exhaust gas discharged from the internal combustion engine. The exhaust gas purification catalyst includes a porous substrate; a catalyst coating layer which is formed on the porous substrate and has a carrier and a noble metal catalyst supported on the carrier; and a dummy coating layer which is formed on the outermost surface of the catalyst coating layer, such as to occupy at least 10%, from the exhaust gas inlet side, of the entire length of the catalyst coating layer along the exhaust gas flow direction, and which includes a carrier having at least alumina and does not include a noble metal catalyst.

In the exhaust gas purification catalyst, the dummy coating layer can act as a trapping and removing mechanism for a poisoning substance contained in the exhaust gas. Thus, when the exhaust gas including a poisoning substance such as P and Ca, which is contained in an engine oil or other additives, reaches the exhaust gas purification catalyst, the poisoning substance is caused to adhere preferentially to the dummy coating layer. Meanwhile, the poisoning substance is unlikely to adhere to the catalyst coating layer. Therefore, in the catalyst coating layer, the active species are unlikely to be covered and the fine pores are unlikely to be closed as a result of adhesion of the poisoning substance. As a consequence, the reduction in the number of active centers of the noble metal catalyst supported on the catalyst coating layer can be prevented. Therefore, the purification performance of the catalyst can be advantageously maintained. As a result, in the exhaust gas purification catalyst disclosed herein, durability against the exhaust gas including the poisoning substance can be improved.

In the preferred embodiment of the exhaust gas purification catalyst disclosed herein, the content of alumina in the dummy coating layer per 1 L of the catalyst volume is 5 g/L to 15 g/L.

Further, in another preferred embodiment of the exhaust gas purification catalyst disclosed herein, the length of the dummy coat layer in the exhaust gas flow direction, from the end on the exhaust gas inlet side, is 10% to 70% of the entire length of the catalyst coating layer along the aforementioned direction.

Further, in another preferred embodiment of the exhaust gas purification catalyst disclosed herein, the average thickness of the dummy coating layer is 5 µm to 15 µm.

Further, in another preferred embodiment of the exhaust gas purification catalyst disclosed herein, the specific surface area of the alumina included in the dummy coating layer is 50 $m^2$/g to 150 $m^2$/g.

With any of those preferred embodiments, the adhesion of the poisoning substance to the dummy coating layer is facilitated. Therefore, the poisoning substance can be more advantageously prevented from reaching the catalyst coating layer, and the reduction in the number of active centers of the noble metal catalyst can be more advantageously prevented. Therefore, the purification performance of the catalyst can be more advantageously maintained.

In yet another preferred embodiment of the exhaust gas purification catalyst disclosed herein, an OSC material is included in at least part of the catalyst coating layer, and no OSC material is included in the dummy coating layer.

The three-way catalyst is designed to function effectively in an exhaust gas atmosphere (referred to hereinbelow as "stoichiometric atmosphere") resulting from near-stoichiometric (theoretical) air-fuel ratio combustion. Thus, in a richer exhaust gas (that is, an exhaust gas generated from combustion of a rich air-fuel mixture) as well as in a leaner exhaust gas (that is, an exhaust gas generated from combustion of a lean air-fuel mixture), the performance of the three-way catalyst is degraded with respect to that in the stoichiometric atmosphere.

Accordingly, to adjust (buffer) the atmosphere in the exhaust gas purification catalyst, as the carrier, an oxygen storing/releasing material (that is, OSC material) including a $CeO_2$ component is used as the carrier. The OSC material stores oxygen in an exhaust gas atmosphere (referred to hereinbelow as "lean atmosphere") with the oxygen content in excess of that in the stoichiometric atmosphere. Further, the OSC material releases oxygen in an exhaust gas atmosphere (referred to hereinbelow as "rich atmosphere") generated from combustion of excess fuel with less oxygen.

In the abovementioned embodiment, the exhaust gas atmosphere in the catalyst coating layer can be effectively maintained as a stoichiometric atmosphere, without storage or release of oxygen in the dummy coating layer including no noble metal catalyst.

DESCRIPTION OF EMBODIMENTS

The embodiments of the present invention will be described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

Described first is an example of an exhaust gas purification apparatus 1 having an exhaust gas purification catalyst 7 according to a typical embodiment of the present invention.

Figure 1:
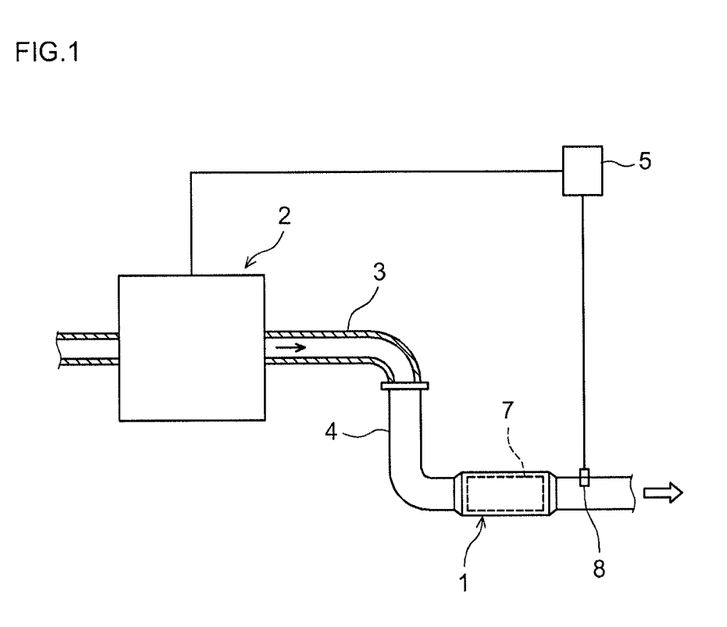
FIG. 1 shows a diagram schematically illustrating an example of an exhaust gas purification apparatus.

FIG. 1 shows a diagram schematically illustrating an example of the exhaust gas purification apparatus 1. As shown in FIG. 1, the exhaust gas purification system 1 is provided in an exhaust system of an internal combustion engine 2.

To the internal combustion engine (engine) 2 according to this embodiment, a mixture including oxygen and fuel gas is supplied. The internal combustion engine 2 burns the gas mixture and converts combustion energy into mechanical energy. The gas mixture burned here produces an exhaust gas which is released to the exhaust system. The internal combustion engine 2 with the configuration shown in FIG. 1 is primarily configured as an automobile gasoline engine.

Described next is the exhaust system of the internal combustion engine 2. An exhaust manifold 3 is connected to an exhaust port (not shown in the drawing) which allows the internal combustion engine 2 to communicate with the exhaust system. The exhaust manifold 3 is connected to an exhaust pipe 4 through which the exhaust gas flows. Herein, the exhaust manifold 3 and the exhaust pipe 4 form the exhaust path of the present embodiment. The arrow in the drawing indicates the flow direction of the exhaust gas.

The exhaust gas purification apparatus 1 purifies hazardous components (e.g. carbon monoxide (CO), hydrocarbons (HC) and nitrogen oxides ($NO_x$)) contained in the exhaust gas discharged from the internal combustion engine 2. Herein, the exhaust gas purification apparatus 1 is equipped with an ECU 5 and the exhaust gas purification catalyst 7.

The ECU 5 is an engine control unit that controls the internal combustion engine 2 and the exhaust gas purification apparatus 1. Similarly to a general control devices, the ECU 5 includes a digital computer and other electronic devices as constituent components. Herein, the ECU 5 is provided with input ports (not shown in the drawing) and is electrically connected to sensors (e.g., a pressure sensor 8) disposed in various locations of the internal combustion engine 2 and the exhaust gas purification apparatus 1. As a result, information detected by the sensors is transmitted as electrical signals via the input ports to the ECU 5. The ECU 5 is also provided with output ports (not shown in the drawing). The ECU 5 is connected via the output ports to the internal combustion engine 2 and the exhaust gas purification apparatus 1 to control the operation of the respective components by sending control signals.

Described next in detail is the exhaust gas purification catalyst 7 suggested herein. The exhaust gas purification catalyst 7 is disposed in the exhaust path of the internal combustion engine 2 and purifies the exhaust gas discharged from the internal combustion engine 2. The exhaust gas purification catalyst 7 is provided to the exhaust pipe 4 through which the exhaust gas flows. More specifically, the exhaust gas purification catalyst 7 is provided on the downstream side of the exhaust pipe 4 as depicted in FIG. 1.

Figure 2:
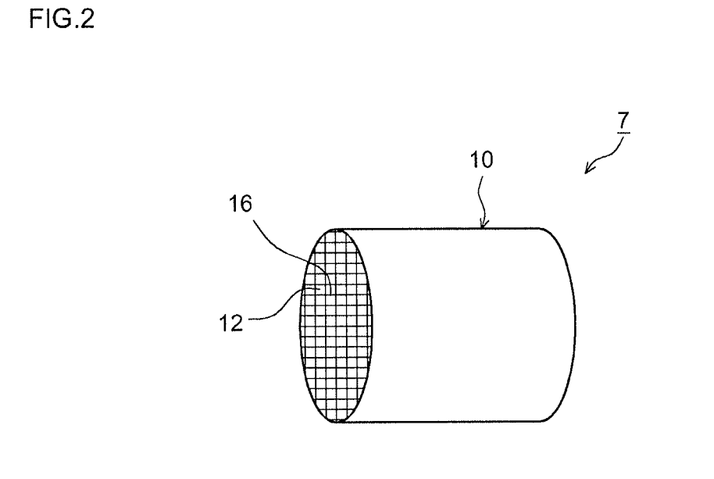
FIG. 2 shows a perspective view schematically illustrating a substrate for the exhaust gas purification catalyst according to an embodiment.
Figure 3:
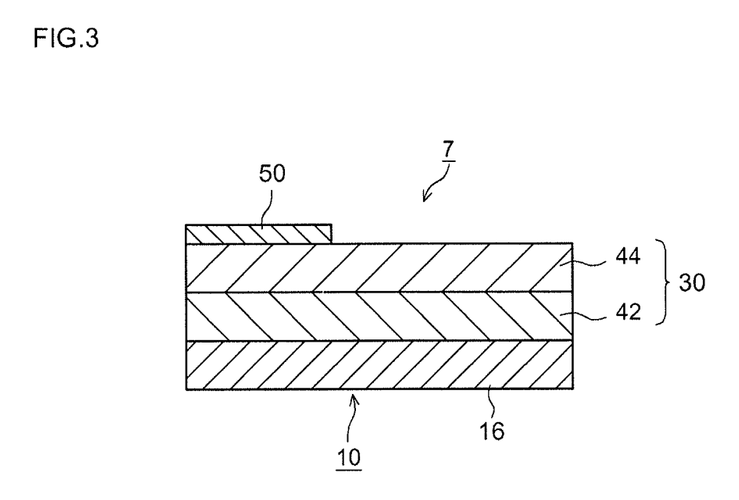
FIG. 3 shows a diagram schematically illustrating in enlarged scale the cross-sectional configuration of the exhaust gas purification catalyst according to an embodiment.

FIG. 2 shows a perspective view schematically illustrating a substrate 10 in the exhaust gas purification catalyst 7. FIG. 3 shows a diagram schematically illustrating in enlarged scale the cross-sectional configuration of the exhaust gas purification catalyst 7. As shown in FIG. 2 and FIG. 3, the exhaust gas purification catalyst 7 includes the substrate 10, a catalyst coating layer 30, and a dummy coating layer 50.

<Substrate 10>

As shown in FIG. 2, the substrate 10 is porous. Various forms of various materials conventionally used for such applications can be used for the substrate 10. For example, the substrate 10 is preferably constituted by a heat-resistant material having a porous structure. Examples of such heat-resistant materials include cordierite, silicon carbide (SiC), aluminum titanate, silicon nitride, and heat-resistant metals such as stainless steel and alloys thereof. Herein, for example, the substrate 10 is shown which has a cylindrical external shape and a honeycomb structure formed of regularly arranged cells (voids) 12 and cordierite partition walls 16 separating the cells 12. The external shape of the entire substrate 10 is not particularly limited. An elliptic cylindrical shape, polygonal cylindrical shape, etc., can be adopted as well.

The substrate 10 has a volume (total cell volume, total bulk volume) of usually 0.1 L or greater (preferably 0.5 L or greater). For instance, it can be 5 L or less (preferably 3 L or less, more preferably 2 L or less, e.g. 1 L or less). The substrate 10 has a full length in the extension direction (a full length in the exhaust gas flow direction) of usually about 10 mm to 500 mm (typically 50 mm to 300 mm, e.g. 100 mm to 200 mm).

<Catalyst Coating Layer 30>

The catalyst coating layer 30 is formed on the substrate 10. In the example shown in FIG. 3, the catalyst coating layer 30 is formed on the partition walls 16 that separate the adjacent cells 12. The catalyst coating layer 30 has a carrier and a noble metal catalyst supported on the carrier. Hazardous components in the exhaust gas discharged from the internal combustion engine 2 are purified when brought into contact with the catalyst coating layer 30. For example, CO and HC in the exhaust gas can be oxidized by the catalyst coating layer 30 and converted (purified) to water ($H_2O$), carbon dioxide ($CO_2$), and the like. Further, $No_X$ can be reduced by the catalyst coating layer 30 and converted (purified) to nitrogen ($N_2$).

An OSC material is included in at least part of the carrier which constitutes the catalyst coating layer 30 and supports the noble metal catalyst. The OSC material is able to store and release oxygen, and thus can stably (as a stoichiometric atmosphere) maintain the air-fuel ratio of the exhaust gas. The type of the OSC material is not particularly limited, and ceria ($CeO_2$) may be used. For example, a ceria-zirconia composite oxide (CZ composite oxide) including a $CeO_2$ component may be used. From the standpoint of improving the physical (mechanical) properties, a preferable OSC material is formed of a CZ composite oxide including a $CeO_2$ component. The form (outer shape) of the carrier of the catalyst coating layer 30 is not particularly limited, but it preferably has a form that yields a large specific surface area. For instance, the carrier has a specific surface area (determined by the BET method; the same applies hereinbelow) of preferably 20 $m^2$/g to 120 $m^2$/g, more preferably 40 $m^2$/g to 80 $m^2$/g. A form advantageous for realizing a carrier having such a specific surface area is a powder form (a particulate form). For example, to realize a carrier having a more advantageous specific surface area, the average particle size (e.g., an average particle size of primary particles based on SEM or TEM observations) of the CZ composite oxide in a powder form may be set to 1 nm to 20 nm, preferably 5 nm to 15 nm, for example, to 7 nm to 12 nm. With the particles having an excessively large average particle size (or an excessively small specific surface area), when supporting the noble metal catalyst on the carrier, the dispersivity of the noble metal tends to decrease, and the purification performance of the catalyst can be degraded. Meanwhile, with the particles having an excessively small particle size (or an excessively large specific surface area), the heat resistance of the carrier itself may degrade, leading to lower heat resistance of the catalyst.

The catalyst coating layer 30 may have, as the carrier, another inorganic compound in combination with the OSC material (for example, a CZ composite oxide). The other inorganic compound preferably has a comparatively large specific surface area. The type of the other inorganic compound is not particularly limited, but preferable examples include alumina ($Al_2O_3$), zirconia ($ZrO_2$), silica ($SiO_2$) and titania ($TiO_2$).

To the carrier of the catalyst coating layer 30, other materials may be added as secondary components. Examples of the materials that can be added to the carrier include rare earth elements such as lanthanum (La) and yttrium (Y), alkaline earth metals such as calcium, and also transition metals, and the like. Among them, rare earth elements such as lanthanum and yttrium are preferable as stabilizing agents because they can increase the specific surface area at a high temperature without hindering the catalytic function.

Metal species capable of functioning as oxidation catalysts or reduction catalysts can be used as the noble metal catalyst supported on the carrier of catalyst coating layer 30. Typically, three-way catalysts including rhodium (Rh), palladium (Pd), and platinum (Pt), which are platinum-group metals, are preferred. Further, ruthenium (Ru), osmium (Os) iridium (Ir), silver (Ag), gold (Au), and the like may be used as the noble metal catalyst. Alloys of those metals may be also used. Catalysts including other metal species (typically, alloys) may be also used.

Among them, a combination of Rh which is high in reduction activity and Pd and/or Pt which is high in oxidation activity is preferred. From the standpoint of increasing the surface area of contact with the exhaust gas, it is preferred that the noble metal catalyst be used in the form of fine particles with a sufficiently small particle size. The average particle size of the particles of the noble metal catalyst (average value of the particle size determined by TEM observations) is usually about 1 nm to 15 nm, preferably 10 nm or less, 7 nm or less, and more preferably 5 nm or less.

The catalyst coating layer 30 may be constituted in its thickness direction by a plurality of coating layers that includes at least two layers having mutually different configurations. The catalyst coating layer may be also constituted by a single layer. In the example depicted in FIG. 3, the catalyst coating layer 30 is constituted by two layers, namely, a lower coating layer 42 and an upper coating layer 44.

The lower coating layer 42 is close to the substrate 10 (typically, to the partition walls 16). The appropriate average thickness of the lower coating layer 42 is, but not particularly limited to, about 20 μm to 500 μm, for instance, preferably about 50 μm to 200 μm.

The upper coating layer 44 is formed on the lower coating layer 42 formed on the partition walls 16. The appropriate average thickness of the upper coating layer 44 is, but not particularly limited to, about 20 μm to 500 μm, or preferably, for instance, about 50 μm to 200 μm. In the present embodiment, the catalyst coating layer 30 has a two-layer structure including the lower coating layer 42 and the upper coating layer 44, but the catalyst coating layer may have a multilayer structure constituted by three or more layers, in which an intermediate coating layer is further provided between the lower coating layer 42 and the upper coating layer 44.

Substances of the same or different types may be used for the carriers of the catalyst coating layer 30 (in this case, the carriers of the lower coating layer 42 and the upper coating layer 44). For example, ceramic material with excellent thermal stability and strength, such as alumina and zirconia, can be used as the carriers of the lower coating layer 42 and the upper coating layer 44. Carriers including an OSC material (CZ composite oxide) are more preferred.

Metal species of the noble metal catalysts supported on the carriers of the catalyst coating layer 30 (that is, the lower coating layer 42 and the upper coating layer 44) may be of the same or different types. For example, metal species (for example, Rh) with high reduction activity can be used for one coating layer, and metal species (for example, Pd and/or Pt) with high oxidation activity can be used for the other coating layer.

<Dummy Coating Layer 50>

The dummy coating layer 50 according to the present invention will be explained hereinbelow. The dummy coating layer can act as a mechanism for trapping (adsorbing) and removing the poisoning substances contained in the exhaust gas. The dummy coating layer 50 is typically formed on the outermost surface of the catalyst coating layer 30. In the case of the catalyst coating layer 30 of a two-layer structure, such as in the present embodiment, the dummy coating layer 50 is formed on the upper coating layer 44.

It is appropriate that the dummy coating layer 50 occupy at least 10%, from the exhaust gas inlet side, of the entire length of the catalyst coating layer 30 along the exhaust gas flow direction, but such a configuration is not limiting. Typically, the length of the dummy coating layer 50 along the exhaust gas flow direction, from the end on the exhaust gas inlet side, is 10% to 70%, preferably 15% to 60%, for example, 20% to 40% of the entire length of the catalyst coating layer 30 in the same direction.

The average thickness of the dummy coating layer 50 is preferably 5 μm to 15 μm, more preferably 5 μm to 10 μm. The average thickness of the dummy coating layer 50 is 1/100 times to 1/2 times, preferably 1/80 times to 1/5 times, more preferably 1/50 times to 1/10 times the average thickness of the catalyst coating layer 30.

The dummy coating layer 50 has at least alumina as the carrier. The content of alumina as the carrier in the dummy coating layer 50 is preferably 5 g/L to 15 g/L, particularly preferably 5 g/L to 10 g/L per 1 L of the catalyst volume. The alumina is preferably porous and may have a porosity of 5% to 40%, for example, 10% to 30%. The average particle size of the alumina (for example, the average particle size of primary particles based on SEM or TEM observations) is, for example, less than that of the carrier included in the catalyst coating layer 30 and may be 1 nm to 20 nm, preferably 5 nm to 15 nm (for example, 7 nm to 12 nm). Further, the specific surface area of the alumina is, for example, larger than that of the carrier included in the catalyst coating layer 30 and usually can be 20 m²/g to 200 m²/g, for example, 50 m²/g to 150 m²/g, preferably 80 m²/g to 120 m²/g, in particular 100 m²/g or more. Where the specific surface area of the alumina is thus high, the mechanism for trapping and removing the poisoning substance can function more effectively. Therefore, the effect of the present invention can be exhibited to a greater extent.

It is preferred that the dummy coating layer 50 include no OSC material. Further, the dummy coating layer 50 may have another inorganic compound (for example, zirconia), other than the OSC material, in combination with the alumina as the carrier.

It is particularly important that the dummy coating layer 50 include no noble metal catalyst supported on the carrier. Thus, the dummy coating layer 50 is a layer free from a noble metal catalyst.

When the engine 2 of an automobile, or the like, is operated, not only fuel such as gasoline, but also engine oil and various additives (antioxidants, purification agents, acid treatment agents, etc.) can be included in the exhaust gas, the specific component of the exhaust gas depending on combustion conditions. Such engine oil and other additives can include poisoning substances such as phosphorus (P), calcium (Ca), lead (Pb), zinc (Zn), and magnesium (Mg). When the exhaust gas including such poisoning substances reaches the conventional exhaust gas purification catalyst, the poisoning substances can adhere to the catalyst coating layer. In the portion of the catalyst coating layer to which the poisoning substances have adhered, the number of active centers of the noble metal catalyst supported on the carrier can be reduced and the catalyst purification performance can be degraded.

In the exhaust gas purification catalyst 7 disclosed herein, the dummy coating layer 50 having alumina as a carrier and including no noble metal catalyst is provided on the outermost surface of the catalyst coating layer 30. When the exhaust gas including poisoning substances contained in the engine oil and other additives reaches the exhaust gas purification catalyst 7, the poisoning substances are preferentially adhered to the dummy coating layer 50. As a result, the concentration of the poisoning substances reaching the catalyst coating layer 30 is reduced and the poisoning substances are unlikely to adhere to the catalyst coating layer 30. Therefore, in the catalyst coating layer 30, the active species are unlikely to be covered and the fine pores are unlikely to be closed as a result of formation of inactive species which is caused by the adhesion of the poisoning substances. Thus, the reduction in the number of active centers of the noble metal catalyst supported on the carrier of the catalyst coating layer 30 can be prevented, and the purification performance of the catalyst can be maintained.

Thus, with the exhaust gas purification catalyst disclosed herein, it is possible to realize high durability (maintain catalyst performance) against the exhaust gas including poisoning components such as derived from engine oil and other additives.

The content of alumina in the dummy coating layer 50 per 1 L of the catalyst volume is preferably 5 g/L to 15 g/L (for example, 8 g/L to 12 g/L).

The length of the dummy coating layer 50, from the end on the exhaust gas inlet side, in the exhaust gas flow direction is 10% to 70% of the entire length of the catalyst coating layer 30 along this direction.

The average thickness of the dummy coating layer 50 can be 5 μm to 15 μm.

Where the alumina content, length, and average thickness of the dummy coating layer 50 are within the abovementioned ranges, the adhesion of the poisoning substances to the dummy coating layer 50 is facilitated. Therefore, the reduction in the number of active centers of the noble metal catalyst in the catalyst coating layer 30 can be advantageously prevented. As a result, the purification performance of the catalyst can be advantageously maintained.

It is preferred that the dummy coating layer 50 include no OSC material. In this case, since no oxygen storage and release by an OSC material is realized in the dummy coating layer 50, the function of the OSC material in the catalyst coating layer 30 can be exhibited more effectively. As a result, the exhaust gas atmosphere in the catalyst coating layer 30 can be advantageously (preferably as a stoichiometric atmosphere) maintained.

The preferred embodiment of the exhaust gas purification catalyst 7 disclosed herein has been explained hereinabove. The exhaust gas purification catalyst disclosed herein will be explained hereinbelow in greater detail on the basis of various examples (samples), but the exhaust gas purification catalyst in accordance with the present invention is not intended to be limited to the below-described examples.

Reference Example

Initially, in the reference example, the position and degree of adhesion of P and Ca, among the poisoning substances contained in the engine oil and other additives, were investigated in the conventional exhaust gas purification catalyst which was not provided with the dummy layer.

First, a substrate with the number of cells of 900 cpsi (cells per square inch), a volume (the entire catalyst volume including the volume of cell passages) of 1 L, and a total length of 100 mm was prepared.

Then, a CZ composite oxide (as a carrier) at 100 g/L, alumina at 40 g/L, an aqueous solution of palladium nitrate with a Pd content of 0.33 g/L, and an aqueous solution of dinitrodiamine platinum with a Pt content of 0.78 g/L were mixed to prepare a lower coating layer slurry.

Then, a CZ composite oxide (as a carrier) at 40 g/L, alumina at 40 g/L, and an aqueous solution of rhodium nitrate with a Rh content of 0.55 g were mixed to prepare an upper coating layer slurry.

The substrate was then dipped into the lower coating layer slurry. Then, the substrate was pulled up from the lower coating layer slurry, dried for 1 h under a temperature condition of 250° C., and then fired for 1 h under a temperature condition of 500° C., thereby forming a lower coating layer on the substrate.

The substrate was then immersed in the upper coating layer slurry. Then, the substrate was pulled up from the upper coating layer slurry, dried for 1 h under a temperature condition of 250° C., and then fired for 1 h under a temperature condition of 500° C., thereby forming an upper coating layer on the substrate.

The exhaust gas purification catalyst obtained in the above-described manner was taken as the catalyst sample of the reference example.

The catalyst sample of the reference example was then installed on a vehicle having a gasoline engine with an exhaust gas amount of 4000 cc. A durability test was then performed for 50 h at an average engine revolution speed of 3000 rpm and the temperature of the exhaust gas at the catalyst inlet of 900° C. An engine oil was added to the gasoline used in the test.

With respect to the catalyst sample of the reference example that underwent the above-described durability test, the adhesion position of P and Ca, among the poisoning substances contained in the engine oil, on the outermost surface of the catalyst coating layer was studied. More specifically, the outermost surface of the catalyst coating layer was divided into 5 zones in the exhaust gas flow direction and the zones with a length which, from an end on an exhaust gas inlet side, was 0% to 20%, 20% to 40%, 40% to 60%, 60% to 80%, and 80% to 100% of the entire length of the catalyst coating layer along the same direction were denoted by S1, S2, S3, S4, and S5, respectively. The adhered amount of P and Ca in the zones S1 to S5 was measured with Axios advanced produced by PANalytical Co.

Figure 4:
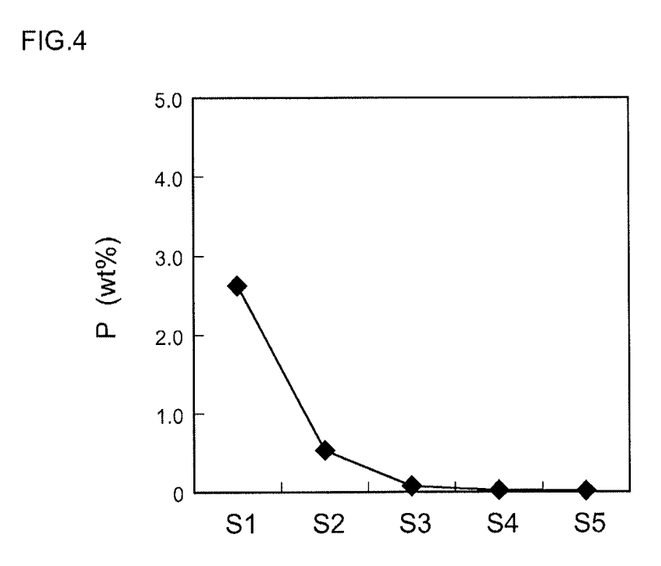
FIG. 4 is a graph illustrating the amount of a poisoning substance (P) which has adhere to a catalyst coating layer in a reference example.
Figure 5:
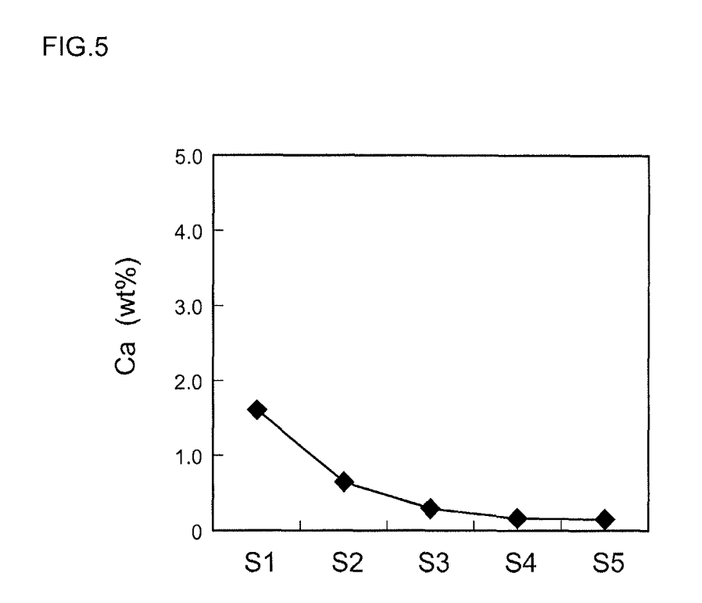
FIG. 5 is a graph illustrating the amount of a poisoning substance (Ca) which has adhere to a catalyst coating layer in a reference example.

The adhered amount of P in the zones S1 to S5 is shown in FIG. 4, and the adhered amount of Ca in the zones S1 to S5 is shown in FIG. 5.

As shown in FIG. 4, it is clear that P, which is a poisoning substance, particularly adhered in the zones S1 to S3 of the catalyst coating layer. More specifically, the adhered amount of P in the zone S1 was 2.0 wt % or more, and the adhered amount of P in the zone S2 was about 0.5 wt %.

Further, as shown in FIG. 5, it is clear that Ca, which is a poisoning substance, particularly adhered, similarly to P, in the zones S1 to S3 of the catalyst coating layer. More specifically, the adhered amount of Ca in the zone S1 was about 1.5 wt %, and the adhered amount of Ca in the zone S2 was about 0.5 wt %.

It follows from the above, that it is preferred that the dummy coating layer in accordance with the present invention be formed on the catalyst coating layer so as to cover at least the zones S1 to S3, more preferably zones S1 and S2, of the catalyst coating layer.

Further, when the penetration depth of P and Ca, which are the poisoning substance, into the catalyst coating layer was measured, it was determined that P penetrated to a maximum of 10 μm from the outermost surface in the thickness direction of the catalyst coating layer and Ca penetrated to a maximum of 5 μm from the outermost surface in the thickness direction of the catalyst coating layer. Therefore, it is clear that the average thickness of the dummy coating layer in accordance with the present invention may be 5 μm to 15 μm, preferably 5 μm to 10 μm.

TEST EXAMPLES

The test examples relating to the present invention are explained hereinbelow. Herein, the catalytic performance of the exhaust gas purification catalyst in accordance with the present invention was investigated. In the present test examples, exhaust gas purification catalysts (catalyst samples) of Examples 1 to 15 were prepared.

Example 1

First, a substrate (volume 1 L, total length 100 mm) similar to that of the reference example was prepared.

Then, a CZ composite oxide (as a carrier) at 100 g/L, alumina at 40 g/L, an aqueous solution of palladium nitrate with a Pd content of 0.33 g/L, and an aqueous solution of dinitrodiamine platinum with a Pt content of 0.78 g/L were mixed to prepare a lower coating layer slurry.

Then, a CZ composite oxide (as a carrier) at 40 g/L, alumina at 40 g/L, and an aqueous solution of rhodium nitrate with a Rh content of 0.55 g were mixed to prepare an upper coating layer slurry.

Then, a dummy coating layer slurry was prepared by using alumina as a carrier at 10 g/L. Alumina with a specific surface area of about 100 m²/g was used in the slurry for forming the dummy coating layer.

The substrate was then dipped into the lower coating layer slurry. Then, the substrate was pulled up from the lower coating layer slurry, dried for 1 h under a temperature condition of 250° C., and then fired for 1 h under a temperature condition of 500° C., thereby forming a lower coating layer on the substrate.

The substrate was then immersed in the upper coating layer slurry. Then, the substrate was pulled up from the upper coating layer slurry, dried for 1 h under a temperature condition of 250° C., and then fired for 1 h under a temperature condition of 500° C., thereby forming the upper coating layer on the substrate.

The substrate was then immersed in the dummy coating layer slurry over a region of 40 mm from the end on the exhaust gas inlet side of the substrate toward the exhaust gas outlet side. Then, the substrate was pulled up from the dummy coating layer slurry, dried for 1 h under a temperature condition of 250° C., and then fired for 1 h under a temperature condition of 500° C., thereby forming the dummy coating layer on the substrate.

The exhaust gas purification catalyst obtained in the above-described manner was taken as the catalyst sample of Example 1.

Example 2

An exhaust gas purification catalyst was fabricated in the same manner as in Example 1, except that the substrate was immersed in the dummy coating layer slurry over a region of 70 mm from the end on the exhaust gas inlet side of the substrate toward the exhaust gas outlet side in the process for fabricating the exhaust gas purification catalyst in Example 1. The obtained exhaust gas purification catalyst was taken as the catalyst sample of Example 2.

Example 3

An exhaust gas purification catalyst was fabricated in the same manner as in Example 1, except that the substrate was immersed in the dummy coating layer slurry over a region of 10 mm from the end on the exhaust gas inlet side of the substrate toward the exhaust gas outlet side in the process for fabricating the exhaust gas purification catalyst in Example 1. The obtained exhaust gas purification catalyst was taken as the catalyst sample of Example 3.

Example 4

An exhaust gas purification catalyst was fabricated in the same manner as in Example 1, except that the content of alumina in the process for fabricating the exhaust gas purification catalyst in Example 1 was changed to 15 g/L. The obtained exhaust gas purification catalyst was taken as the catalyst sample of Example 4.

Example 5

An exhaust gas purification catalyst was fabricated in the same manner as in Example 4, except that the substrate was immersed in the dummy coating layer slurry over a region of 70 mm from the end on the exhaust gas inlet side of the substrate toward the exhaust gas outlet side in the process for fabricating the exhaust gas purification catalyst in Example 4. The obtained exhaust gas purification catalyst was taken as the catalyst sample of Example 5.

Example 6

An exhaust gas purification catalyst was fabricated in the same manner as in Example 4, except that the substrate was immersed in the dummy coating layer slurry over a region of 10 mm from the end on the exhaust gas inlet side of the substrate toward the exhaust gas outlet side in the process for fabricating the exhaust gas purification catalyst in Example 4. The obtained exhaust gas purification catalyst was taken as the catalyst sample of Example 6.

Example 7

An exhaust gas purification catalyst was fabricated in the same manner as in Example 1, except that the content of alumina in the process for fabricating the exhaust gas purification catalyst in Example 1 was changed to 5 g/L. The obtained exhaust gas purification catalyst was taken as the catalyst sample of Example 7.

Example 8

An exhaust gas purification catalyst was fabricated in the same manner as in Example 7, except that the substrate was immersed in the dummy coating layer slurry over a region of 70 mm from the end on the exhaust gas inlet side of the substrate toward the exhaust gas outlet side in the process for fabricating the exhaust gas purification catalyst in Example 7. The obtained exhaust gas purification catalyst was taken as the catalyst sample of Example 8.

Example 9

An exhaust gas purification catalyst was fabricated in the same manner as in Example 7, except that the substrate was immersed in the dummy coating layer slurry over a region of 10 mm from the end on the exhaust gas inlet side of the substrate toward the exhaust gas outlet side in the process for fabricating the exhaust gas purification catalyst in Example 7. The obtained exhaust gas purification catalyst was taken as the catalyst sample of Example 9.

Example 10

An exhaust gas purification catalyst was fabricated in the same manner as in Example 1, except that the substrate was not immersed in the dummy coating layer slurry in the process for fabricating the exhaust gas purification catalyst in Example 1. The obtained exhaust gas purification catalyst was taken as the catalyst sample of Example 10.

Example 11

An exhaust gas purification catalyst was fabricated in the same manner as in Example 1, except that the substrate was immersed in the dummy coating layer slurry over a region of 80 mm from the end on the exhaust gas inlet side of the substrate toward the exhaust gas outlet side in the process for fabricating the exhaust gas purification catalyst in Example 1. The obtained exhaust gas purification catalyst was taken as the catalyst sample of Example 11.

Example 12

An exhaust gas purification catalyst was fabricated in the same manner as in Example 1, except that the entire substrate was immersed in the dummy coating layer slurry in the process for fabricating the exhaust gas purification catalyst in Example 1. The obtained exhaust gas purification catalyst was taken as the catalyst sample of Example 12.

Example 13

An exhaust gas purification catalyst was fabricated in the same manner as in Example 1, except that the substrate was immersed in the dummy coating layer slurry over a region of 5 mm from the end on the exhaust gas inlet side of the substrate toward the exhaust gas outlet side in the process for fabricating the exhaust gas purification catalyst in Example 1. The obtained exhaust gas purification catalyst was taken as the catalyst sample of Example 13.

Example 14

An exhaust gas purification catalyst was fabricated in the same manner as in Example 11, except that the content of alumina in the process for fabricating the exhaust gas purification catalyst in Example 11 was changed to 20 g/L. The obtained exhaust gas purification catalyst was taken as the catalyst sample of Example 14.

Example 15

An exhaust gas purification catalyst was fabricated in the same manner as in Example 13, except that the content of alumina in the process for fabricating the exhaust gas purification catalyst in Example 13 was changed to 3 g/L. The obtained exhaust gas purification catalyst was taken as the catalyst sample of Example 15.

Table 1 shows the summary of the catalyst samples of the exhaust gas purification catalysts in Examples 1 to 15.

TABLE 1

| | Dummy coating layer | | T50 | | |
|---|---|---|---|---|---|
| | Alumina content (g/L) | Length (%) | HC (° C.) | CO (° C.) | NOx (° C.) |
| Example 1 | 10 | 40 | 392 | 383 | 380 |
| Example 2 | 10 | 70 | 396 | 386 | 384 |
| Example 3 | 10 | 10 | 395 | 387 | 384 |
| Example 4 | 15 | 40 | 396 | 387 | 385 |
| Example 5 | 15 | 70 | 397 | 387 | 386 |
| Example 6 | 15 | 10 | 398 | 389 | 389 |
| Example 7 | 5 | 40 | 392 | 384 | 382 |
| Example 8 | 5 | 70 | 398 | 390 | 390 |
| Example 9 | 5 | 10 | 395 | 387 | 386 |
| Example 10 | — | — | 405 | 395 | 395 |
| Example 11 | 10 | 80 | 415 | 402 | 407 |
| Example 12 | 10 | 100 | 402 | 390 | 389 |
| Example 13 | 10 | 5 | 407 | 398 | 399 |
| Example 14 | 20 | 80 | 422 | 410 | 413 |
| Example 15 | 3 | 5 | 406 | 397 | 396 |

The catalyst samples of Examples 1 to 15 were installed on a vehicle having a gasoline engine with an exhaust gas amount of 4000 cc. A durability test was then performed for 50 h at an average engine revolution speed of 3000 rpm and the temperature of the exhaust gas at the catalyst inlet of 900° C. An engine oil was added to the gasoline used in the test.

The catalyst samples of Examples 1 to 15 were then mounted on a model gas generation device, and the light-off temperature T50 (° C.) relating to the purification of HC, CO, and NOx was measured. Herein, T50 (° C.) is the exhaust gas temperature at the inlet side of the catalyst when the temperature of the exhaust gas (model gas) flowing into the catalyst is gradually raised from 100° C. to 500° C. at a rate of 30° C./min and the purification rate reaches 50%. The exhaust gas has a fuel-air ratio of 14.6, and the frequency of the fuel-air ratio is about 1.0 Hz. The results on the light-off temperature T50 of HC, CO, and NOx in the catalyst samples of Examples 1 to 15 which was measured under such conditions is shown in Table 1. The relationship between the length of the dummy coal layer and the light-off temperature (T50) is shown in FIG. 6.

Figure 6:
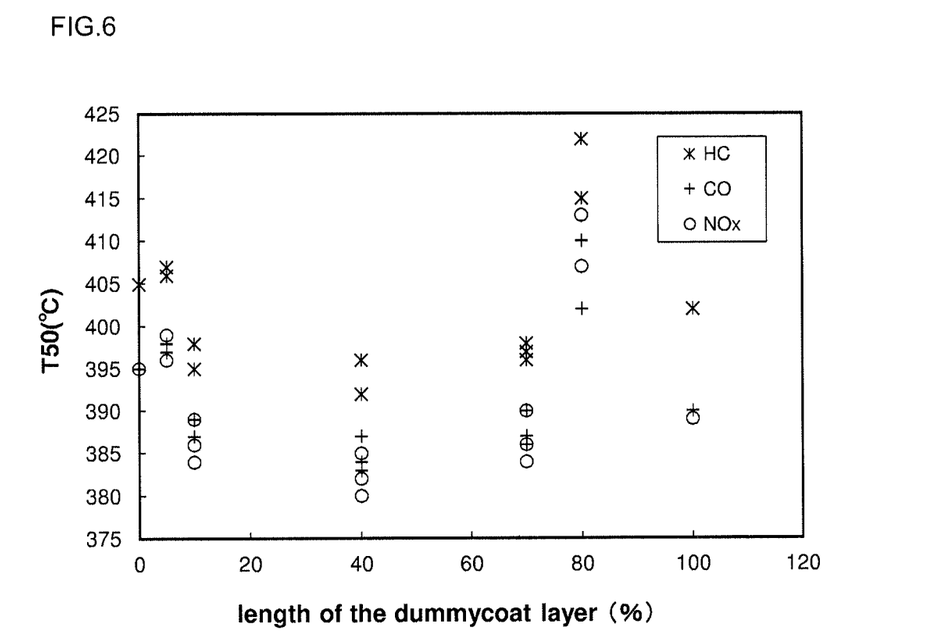
FIG. 6 is a graph illustrating the relationship between the length of the dummy coating layer and the light-off temperature (T50).

As indicated in Table 1 and FIG. 6, in Examples 1 to 9 in which the alumina content in the dummy coating layer was 5 g/L to 15 g/L and the length of the dummy coating layer in the exhaust gas flow direction, from the end on the exhaust gas inlet side, was 10% to 70% of the entire length of the catalyst coating layer in the same direction, the light-off temperature T50 of HC, CO, and NOx has reduced and the purification performance of the catalyst has improved with respect to those of Example 10 in which no dummy coating layer was provided. In particular, in Examples 1 and 7 in which the alumina content in the dummy coating layer was 5 g/L to 10 g/L and the length of the dummy coating layer in the exhaust gas flow direction, from the end on the exhaust gas inlet side, was 40%, the light-off temperature T50 has reduced more and the purification performance of the catalyst has advantageous improved with respect to those of other examples. Meanwhile, in Examples 11 to 13 in which the length of the dummy coating layer in the exhaust gas flow direction, from the end on the exhaust gas inlet side, was less than 10% or greater than 70% of the entire length of the catalyst coating layer in the same direction, the light-off temperature T50 of HC exceeded 400° C. In particular, in Examples 11 and 13, the light-off temperature T50 of HC, CO, and NOx has increased over that in Example 10 in which no dummy coating layer was provided and the purification performance has degraded. In Examples 14 and 15 in which the alumina content in the dummy coating layer was less than 5 g/L or greater than 15 g/L, the light-off temperature T50 has also increased and the purification performance of the catalyst has also degraded.

The results presented hereinabove indicate that by setting the alumina content in the dummy coating layer to 5 g/L to 15 g/L (preferably, 5 g/L to 10 g/L) and/or setting the length of the dummy coating layer in the exhaust gas flow direction, from the end on the exhaust gas inlet side, to 10% to 70% (preferably, about 40%) of the entire length of the catalyst coating layer in the same direction, it is possible to improve the purification performance of the catalyst.

The present invention has been explained hereinabove in detail, but the embodiments and examples thereof are merely exemplary, and the invention disclosed herein is also inclusive of various modifications and variants of the above-described specific examples.

REFERENCE SIGNS LIST 1 exhaust gas purification apparatus
2 internal combustion engine (engine)
3 exhaust manifold
4 exhaust pipe
5 ECU
7 exhaust gas purification catalyst
10 substrate (porous substrate)
12 cell
16 partition wall
30 catalyst coating layer
42 lower coating layer
44 upper coating layer
50 dummy coating layer

The invention claimed is:
1. An exhaust gas purification catalyst, disposed in an exhaust gas passage of an internal combustion engine and purifying an exhaust gas discharged from the internal combustion engine,
the exhaust gas purification catalyst comprising:
a porous substrate;
a catalyst coating layer formed on the porous substrate; and a dummy coating layer formed on the outermost surface of the catalyst coating layer, wherein the catalyst coating layer has a carrier and a noble metal catalyst supported on the carrier; and the dummy coating layer is constituted by alumina, does not include a noble metal catalyst, and is formed to have a length which, from an end on an exhaust gas inlet side, is 10% to 70% of an entire length of the catalyst coating layer along an exhaust gas flow direction; and a specific surface area of the alumina included in the dummy coating layer is larger than that of the carrier included in the catalyst coating layer, wherein the alumina included in the dummy coating layer has a specific surface area of 50 $m^2/g$ or more.

2. The exhaust gas purification catalyst according to claim 1, wherein the alumina content in the dummy coating layer per 1 L of a catalyst volume is 5 g/L to 15 g/L.

3. The exhaust gas purification catalyst according to claim 1, wherein an average thickness of the dummy coating layer is 5 μm to 15 μm.

4. The exhaust gas purification catalyst according to claim 1, wherein an OSC material is included in at least part of the catalyst coating layer, and no OSC material is included in the dummy coating layer.

5. The exhaust gas purification catalyst according to claim 1, wherein the specific surface area of the alumina included in the dummy coating layer is 50 $m^2/g$ to 150 $m^2/g$.

6. The exhaust gas purification catalyst according to claim 1, wherein the specific surface area of the alumina included in the dummy coating layer is 50 $m^2/g$ to 200 $m^2/g$.

7. The exhaust gas purification catalyst according to claim 1, wherein the specific surface area of the alumina included in the dummy coating layer is 80 $m^2/g$ to 120 $m^2/g$.

8. The exhaust gas purification catalyst according to claim 1, wherein the specific surface area of the alumina included in the dummy coating layer is 100 $m^2/g$ or more.

* * * * *